United States Patent
Chua et al.

(10) Patent No.: US 7,957,773 B2
(45) Date of Patent: *Jun. 7, 2011

(54) SYSTEM AND METHOD FOR ENABLING SAFE HANDS-FREE OPERATION OF A WIRELESS TELEPHONE IN A VEHICLE

(75) Inventors: Poh C. Chua, Fairfax, VA (US); Cheri L. Bradley, Auburn, GA (US)

(73) Assignee: Poledo Holdings LLC, Wilmington, DE (US)

( * ) Notice: Subject to any disclaimer, the term of this patent is extended or adjusted under 35 U.S.C. 154(b) by 267 days.

This patent is subject to a terminal disclaimer.

(21) Appl. No.: 10/725,579

(22) Filed: Dec. 3, 2003

(65) Prior Publication Data

US 2004/0121783 A1  Jun. 24, 2004

Related U.S. Application Data

(63) Continuation of application No. 09/965,090, filed on Sep. 28, 2001, now Pat. No. 6,690,956.

(51) Int. Cl.
*H04M 1/00* (2006.01)
(52) U.S. Cl. ............... 455/569.2; 455/569.1; 455/575.9
(58) Field of Classification Search .............. 455/569.1, 455/569.2, 456.1, 456.3, 575.9, 450, 452.1, 455/41.3, 41.2, 557, 151.2, 345, 346, 88; 340/5.72, 5.71, 998, 989, 990; 701/213, 701/32

See application file for complete search history.

(56) References Cited

U.S. PATENT DOCUMENTS

| | | | |
|---|---|---|---|
| 5,042,063 A | 8/1991 | Sakanishi et al. | |
| 5,165,095 A | 11/1992 | Borcherding | |
| 5,214,789 A * | 5/1993 | George | 455/440 |
| 5,452,340 A | 9/1995 | Engelbeck et al. | |
| 5,499,288 A | 3/1996 | Hunt et al. | |
| 5,663,734 A | 9/1997 | Krasner | |
| 5,826,199 A | 10/1998 | Maeda | |
| 5,867,794 A | 2/1999 | Hayes et al. | |
| 5,991,364 A | 11/1999 | McAllister | |
| 6,009,383 A | 12/1999 | Mony | |
| 6,018,568 A | 1/2000 | Furman | |
| 6,032,054 A | 2/2000 | Schwinke | |
| 6,108,567 A | 8/2000 | Hosonuma | |
| 6,134,456 A | 10/2000 | Chen | |
| 6,262,657 B1 * | 7/2001 | Okuda et al. | 340/439 |

(Continued)

OTHER PUBLICATIONS

International Search Report PCT/US02/29678, BellSouth Intellectual Property Corporation.
International Preliminary Examination Report PCT/US02/29678, BellSouth Intellectual Property Corporation.
FM Navigator Nokia, 5100 & 6100 (Skymall Catalogue, p. 59, Summer, 2001).
Motorola StarTac (SkyMall Catalogue, p. 59, Summer, 2001).
UConnect hands-free communication system, www.wjjeeps.com/uconnect.htm, 3 pages (Dec. 21, 2002 version, printed Jul. 20, 2005).

*Primary Examiner* — Jean A Gelin
(74) *Attorney, Agent, or Firm* — Connolly Bove Lodge & Hutz LLP

(57) ABSTRACT

A system and method for using a wireless telephone in a vehicle in a hands-free mode. The wireless telephone and the vehicle have corresponding mating units. When a predetermined condition is satisfied while the mating units are not united, one of the wireless telephone and the vehicle is disabled. The predetermined condition can be one of several situations. For example, one condition may be that an attempt is being made to use the wireless telephone in the vehicle while the vehicle is moving. Another condition may be that an attempt is being made to move the vehicle while the wireless telephone is being used in a wireless communication session within the vehicle. When the mating units are united, the vehicle functions normally and the wireless telephone operates in a hands-free mode.

24 Claims, 8 Drawing Sheets

U.S. PATENT DOCUMENTS

| | | |
|---|---|---|
| 6,427,115 B1 | 7/2002 | Sekiyama |
| 6,434,400 B1 | 8/2002 | Villevieille et al. |
| 6,502,022 B1 | 12/2002 | Chastain et al. |
| 6,687,497 B1 * | 2/2004 | Parvulescu et al. ............ 455/420 |
| 6,687,517 B2 * | 2/2004 | Kinnunen ................. 455/569.1 |
| 6,690,956 B2 * | 2/2004 | Chua et al. ................. 455/569.2 |
| 6,778,068 B2 * | 8/2004 | Wolfe .......................... 340/5.72 |
| 6,784,809 B2 * | 8/2004 | Flick .............................. 340/989 |
| 7,772,966 B2 * | 8/2010 | Turnbull et al. ............ 340/425.5 |
| 2002/0028655 A1 * | 3/2002 | Rosener et al. ................. 455/16 |
| 2002/0032048 A1 * | 3/2002 | Kitao et al. .................... 455/569 |
| 2002/0142803 A1 * | 10/2002 | Yamamoto .................... 455/557 |
| 2003/0032460 A1 | 2/2003 | Cannon et al. |
| 2003/0055560 A1 * | 3/2003 | Phillips ......................... 701/213 |

* cited by examiner

SYSTEM AND METHOD FOR ENABLING SAFE HANDS-FREE OPERATION OF A WIRELESS TELEPHONE IN A VEHICLE

This is a continuation application of U.S. application Ser. No. 09/965,090, filed Sep. 28, 2001 now U.S. Pat. No. 6,690,956, which is incorporated herein by reference in its entirety.

BACKGROUND

1. Field of the Invention

The present invention relates to wireless telephones, and more particularly, to a system and method for enabling safe hands-free operation of a wireless telephone in a vehicle.

2. Background of the Invention

It has been reported that using a wireless telephone while driving is a major cause of traffic accidents. Drivers who must keep their wireless telephones close to their ears are unable to keep both hands on the steering wheels. Many governments are enacting laws that regulate the use of wireless telephones in moving vehicles.

Efforts have been made to enable drivers to use their wireless telephones in a "hands-free" mode. One such effort is described in U.S. Pat. No. 5,867,794, which was granted to Hayes et al. on Feb. 2, 1999 (the "'794 patent"). The '794 patent discloses a wireless telephone communication device that can be operated in a hands-free mode with received audio signals being relayed to the vehicle's radio for output on the speakers of the vehicle's radio. Basically, the device re-transmits the received audio using an FM frequency that is received and reproduced by the radio of the vehicle. The '794 patent is incorporated herein by reference in its entirety.

As described below, the present invention relies on pinpointing the location of the wireless telephone relative to the vehicle. The Federal Communications Commission (FCC) has promulgated new rules related to emergency call processing. The FCC's wireless Enhanced 911 (E911) rules require certain Commercial Mobile Radio Services (CMRS) carriers to begin transmission of enhanced location and identity information in two phases. The first phase, which began on Apr. 1, 1998, required wireless service providers to transmit a 911 caller's number and section of the cell site from which the call is originated to a public safety answering point (PSAP). The second phase, scheduled to begin on Oct. 31, 2001, requires all wireless service providers to locate two-thirds of all 911 callers within 125 meters of their physical locations. In other words, for all 911 calls received, a PSAP must be able to pinpoint 67% of the callers within 125 meters. It is expected that location tracking technologies to be utilized to implement E911 are likely to have greater accuracy than that required by the FCC.

Under the FCC rules, wireless communication networks and wireless telephones (or any wireless devices that can be used to call 911), must provide both the identity and location of the caller to a 911 dispatcher. To provide a caller's identity, the wireless device will furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

SUMMARY OF THE INVENTION

The present invention is a system and method for enabling safe hands-free operation of a wireless telephone in a vehicle. One embodiment of the invention disables or suspends wireless communication capabilities of the wireless telephone until the wireless telephone is docked in or mated with the vehicle to allow a hands-free operation of the wireless telephone. Another embodiment disables or suspends operation of the vehicle until mating units of the wireless telephone and the vehicle are united so that the wireless telephone can be operated hands-free. Different technologies can be used to determine the presence of the wireless telephone within the vehicle. A number of different methods can be used to disable one of the wireless telephone and the vehicle. Similarly, a variety of ways can be utilized to implement the hands-free mode of the wireless telephone.

In one embodiment, location tracking technology is utilized to determine the presence of the wireless telephone within the vehicle. In this embodiment, location information pinpointing the locations of both the wireless telephone and the vehicle is processed by a microprocessor to determine whether a potentially unsafe condition exists for simultaneous use of the wireless telephone and the vehicle. If the unsafe condition exists, e.g., if the wireless telephone is located within a moving vehicle, then the wireless telephone is disabled unless and until the wireless telephone is switched to a hands-free mode. Preferably, the hands-free mode is enabled only when the wireless telephone is docked in or mated with the vehicle.

In another embodiment, the vehicle is adapted to interfere with wireless communication capabilities of the wireless telephone when the wireless telephone is located within the vehicle. Preferably, when the vehicle is in motion, a device installed in the vehicle creates an interference that disrupts any wireless communication attempted by the driver or the passengers. Preferably, the interference is calibrated to affect a limited space within the vehicle. For example, if the device is installed in the steering wheel of the vehicle, no wireless communication session may be established by the wireless telephone within a two-foot distance of the steering wheel. When the wireless telephone is docked in or mated with the vehicle, the interference is terminated to enable hands-free operation of the wireless telephone. The device may be, for example, a transceiver that can generate appropriate radio signals to interfere with the wireless telephone's operation.

During the hands-free mode, audio signals received by the wireless telephone are channeled, routed, or otherwise transmitted to one or more speakers that can reproduce or output sound at a decibel level loud enough for the user/driver to hear without putting the wireless telephone next to his or her ear. In one implementation, the speaker may be that which is normally used to output sounds from a radio. In another implementation, the speaker may be a dedicated speaker installed in the vehicle for the purposes of the invention. In still another implementation, the speaker may be a component of the wireless telephone itself.

In preferred embodiments of the invention, the wireless telephone or the vehicle, or both, are equipped with a sound module. The sound module works during the hands-free mode. The sound module enables the user to perform a number of tasks hands-free, for example, the driver can dial telephone numbers using his or her voice with the sound module.

DETAILED DESCRIPTION OF EMBODIMENTS

Figure 1:
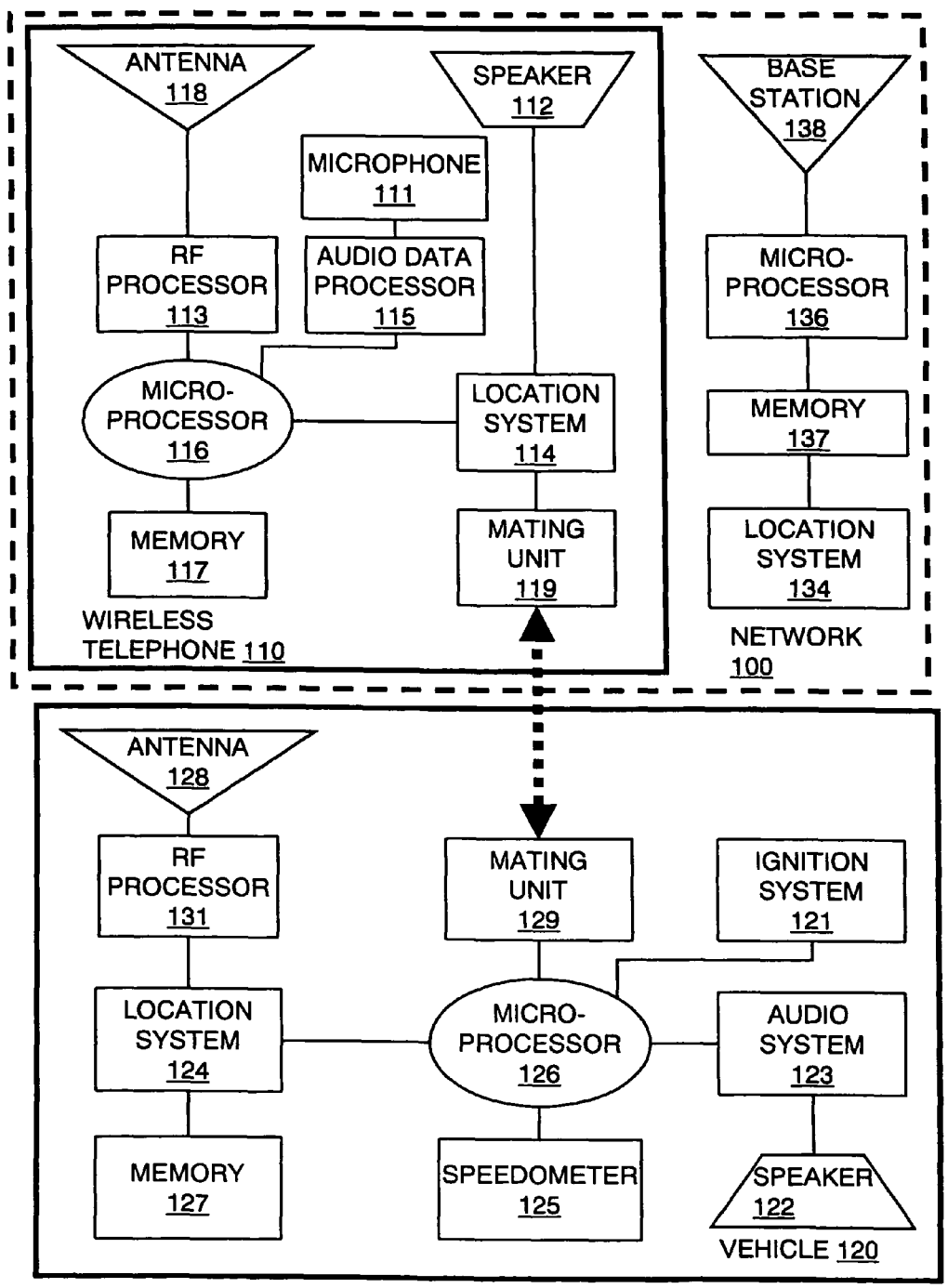
FIG. 1 is a schematic diagram showing a system architecture of one embodiment of the invention that utilizes location tracking technology.

FIG. 1 is a schematic diagram showing the system architecture of an embodiment of the present invention that utilizes location tracking technology.

Wireless telephone 110 comprises a microphone 111, a speaker 112, an RF processor 113, a location system 114, an audio data processor 115, a microprocessor 116, a memory 117, an antenna 118, and a mating unit 119. Wireless telephone 110 is a component operating within wireless communication network 100. Wireless communication network 100 includes location system 134, microprocessor 136, memory 137, and base station 138. Vehicle 120 may be an automobile, a bus, a truck, or other vehicle within which wireless telephone 110 is adapted to operate in a hands-free mode. Ignition system 121, speaker 122, audio system 123, location system 124, speedometer 125, microprocessor 126, memory 127, antenna 128, mating unit 129, and RF processor 131 are components of vehicle 120.

Mating unit 119 of wireless telephone 110 is adapted to dock in or mate with corresponding mating unit 129 of vehicle 120. Mating units 119 and 129 can be one of several docking or cradle systems that enables wireless telephone 110 to rest securely within vehicle 120. Preferably, mating units 119 and 129 have corresponding pins or conductors that enable signal transmission between wireless telephone 110 and vehicle 120. For example, audio signals received by wireless telephone 110 can be transmitted through mating units 119 and 129 for output by speaker 122. Another method for outputting audio signals by speaker 122 is disclosed in the '794 patent.

Preferably, mating unit 119 is adapted to switch wireless telephone 110 into the hands-free mode when it is united with mating unit 129. Preferably, mating unit 129 is adapted to control ignition system 121 through microprocessor 126. When wireless telephone 110 is operated in the hands-free mode, microphone 111 operates normally, but wireless telephone 110 transmits received audio signals for output through the vehicle's speaker 122.

Speaker 122 is part of audio system 123 of vehicle 120. Audio system 123 may be a radio, a compact disc player, a cassette player, or a combination of the above. During a hands-free operation of wireless telephone 110, in some embodiments, sound that would otherwise be output by speaker 112 is channeled via mating units 119 and 129 for output by speaker 122. Speaker 122 may be that which is typically used to output sound received via FM or AM broadcast signals. Speaker 122 can also be a dedicated speaker installed on vehicle 120 for the purposes of implementing this invention. In other embodiments, speaker 112 itself can be adapted to output sound at an increased decibel level that is high enough for the user of wireless telephone 110 to hear during hands-free operations.

Location systems 114 and 124 generate location information pinpointing the locations of wireless telephone 110 and vehicle 120, respectively. In addition to or in lieu of location systems 114 and 124, which are mobile units incorporated within wireless telephone 110 and vehicle 120, respectively, network-based location system 134 may be used to generate location information for wireless telephone 110 and vehicle 120 may be used.

For example, location systems 114 and 124 are GPS receivers that are in wireless communication with a constellation of GPS satellites (not shown). In preferred embodiments, the addition of network-based location system 134 to location systems 114 and 124 provides redundancy, accuracy, and reliability. Location information may be generated by location system 134 using known methods. For example, location system 134 may use signal strengths received from three or more base stations that are in communication with wireless telephone 110 and vehicle 120.

Location information generated by location systems 114, 124, and 134 comprises point coordinates of wireless telephone 110 and vehicle 120. The point coordinates comprise an X component and a Y component of a coordinate system. In an exemplary embodiment of the present invention, the location information comprises a longitude and a latitude. For increased accuracy and granularity, the location information can further comprise an altitude that represents a Z component of the coordinate system. This accounts for the possibility that the vehicle may be located in, for example, a parking garage such that the user and the vehicle may have the same X, Y coordinates, but still be far apart.

The location information can be generated in accordance with certain predetermined rules or schedules. For example, the location information for wireless telephone 110 is generated continuously when wireless telephone 110 is in standby or active mode. To conserve battery on wireless telephone 110, it is preferably that the location information for wireless telephone 110 be generated only when an attempt to establish a communication session is made. Preferably, the location information for vehicle 120 is generated continuously when the engine of vehicle 120 is running.

In preferred embodiments, location systems 114 and 124 are GPS receivers that generate the location information using information received from a constellation of GPS satellites. Network-based location system 134 can generate the location system using triangulation across cell sites based on, for example, signals detected from wireless telephone 110 and vehicle 120. In other embodiments, the location information may be generated using designation of cell sites.

In one embodiment in which the intelligence of the invention is network-based, microprocessor 136 receives location information of wireless telephone 110 and vehicle 120 from one or more of location systems 114, 124, and 134. In addition, microprocessor 136 can receive identity information of wireless telephone 110 and vehicle 120. The identity information may comprise, for example, serial numbers of wireless telephone 110 and vehicle 120. For wireless telephone 110, the identity information may be one or more of the electronic serial number (ESN) and the mobile identification number (MIN) of wireless telephone 110. For vehicle 120, other identification methods may be used. For example, location system 124 may be assigned a unique number, such as vehicle identification number (VIN). The unique number serves as the identity information of vehicle 120. Microprocessor 136 receives the location and identity information using known wireless communication technologies.

Using the location information and the identity information of wireless telephone 110 and vehicle 120, microprocessor 136 can be adapted to execute a number of actions according to rules, instructions, or preferences provided by a user of wireless telephone 110. For example, microprocessor 136 can use the location information and the identity information to activate or deactivate one or more service features subscribed to by the user of wireless telephone 110. Any service features available in wireless communications may be activated or deactivated by the present invention. These service features can include, for example, disabling or suspending part or all functions of wireless telephone 110, forwarding all calls intended for wireless telephone 110 to a different telephone, or routing all calls intended for wireless telephone 110 to a voice mailbox.

Although shown as separate components in FIG. 1, memory 117, 127, and 137 can be an integrated component of microprocessors 116, 126, and 136, respectively. Each of memories 117, 127, and 137 can store, for example, the location information, the identity information, and the rules, instructions, or preferences supplied by the user.

In embodiments in which the intelligence of the invention is not network-based, one or both microprocessors 116 and 126 can be used to execute the rules, instructions, or preferences of the user. For example, microprocessor 116 and memory 117 can process location information received from one or more of location systems 114, 124, and 134 to suspend or disable wireless telephone 110 if mating units 119 and 129 are not united. Similarly, in another example, microprocessor 126 and memory 127 can process location information received from one or more of location systems 114, 124, and 134 to disallow operation of vehicle 120 until mating units 119 and 129 are united. In one specific implementation, for example, microprocessor 126 can prevent ignition system 121 from starting the engine of vehicle 120.

In some embodiments, in lieu of or in addition to location system 124, information received from speedometer 125 of vehicle 120 can be used to decide whether wireless telephone 110 should be disabled or suspended. For example, if vehicle 120 is moving, wireless telephone 110 will be inoperable within vehicle 120 until mating units 119 and 129 are united. Location systems 114, 124 and 134 can also provide information regarding whether vehicle 120 is moving. For example, microprocessor 126 can determine location versus time to calculate a velocity of vehicle 120.

Antenna 118, antenna 128, and base station 138 are used during wireless communication sessions among wireless telephone 110, vehicle 120, and network 100.

Figure 2:
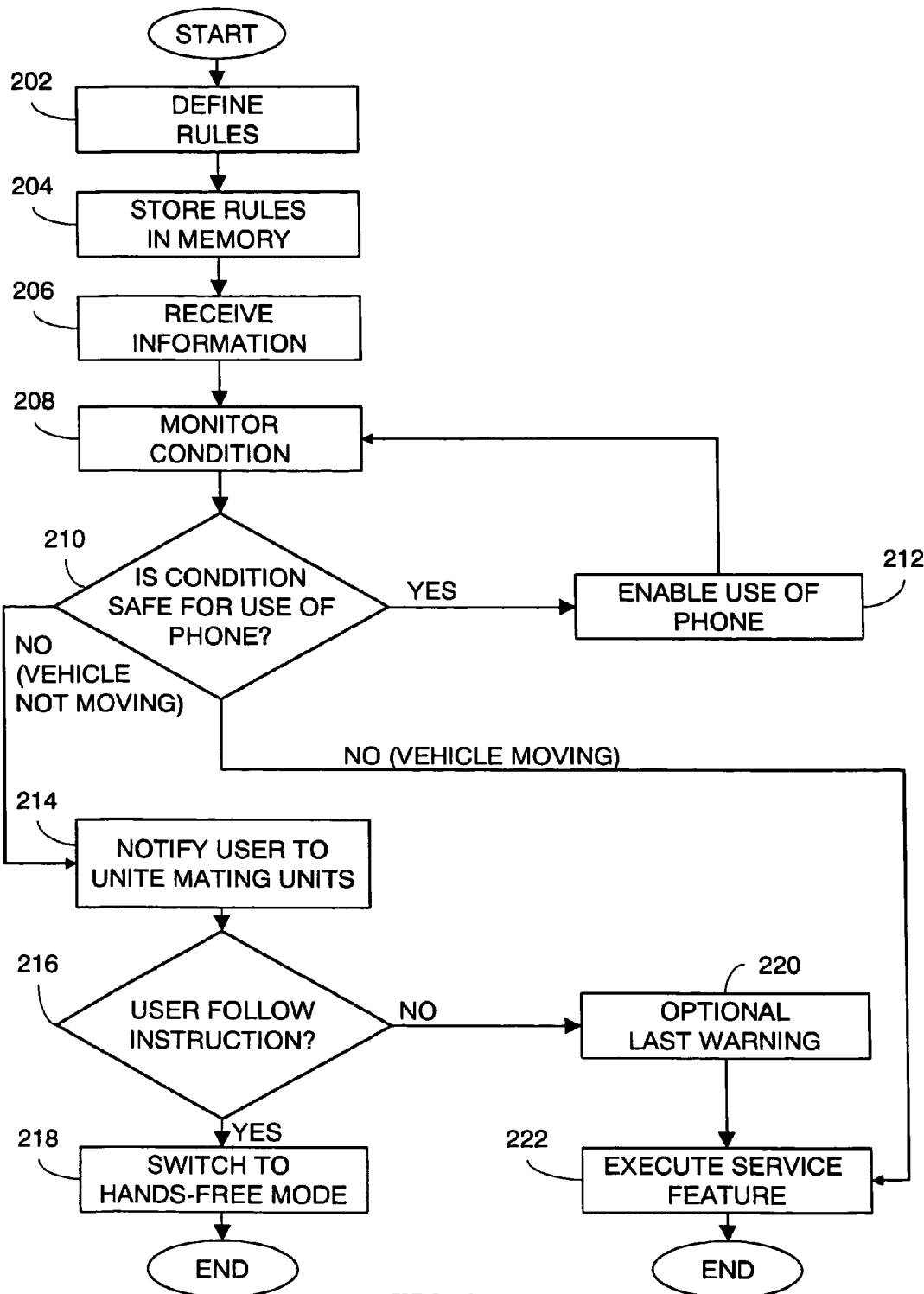
FIG. 2 is a flowchart illustrating exemplary steps involved in using one embodiment of the invention in which the wireless telephone is disabled unless it is in the hands-free mode.

FIG. 2 is a flowchart showing exemplary steps involved in using one embodiment of the present invention. For convenience and illustration purposes, references are made to elements shown in FIG. 1.

In step 202, an authority defines a set of rules, instructions, or preferences to implement the invention. That authority may be, for example, the user, a parent of the user, an employer of the user, or a government agency. In embodiments in which location tracking technology is used, for example, the rules can relate or associate location information of wireless telephone 110 and vehicle 120 with the execution of one or more actions. The actions may affect operations of wireless telephone 110 or vehicle 120, or both.

Specific examples of the rules may include:

Rule No. 1: When wireless telephone 110 is located within a predetermined distance, e.g., ten feet, of vehicle 120, issue a warning to the user that the user should not continue to use wireless telephone 110 if the user plans to drive vehicle 120.

Rule No. 2: If vehicle 120 begins to move while wireless telephone 110 is engaged in a wireless communication session, disable wireless telephone 110 immediately unless mating units 119 and 129 are united for a hands-free operation of wireless telephone 110.

Rule No. 3: If wireless telephone 110 is powered on while vehicle 120 is moving, inform the user that wireless telephone 110 is inoperable until mating units 119 and 129 are united.

In step 204, the rules are stored in memory 117, which is accessible to microprocessor 116. The rules may be stored in memory 117 using any known format. In preferred embodiments, the rules can be input by the manufacturer of wireless telephone 110, a representative of network 100, the authority that defined the rules in step 202, the user of wireless telephone 110, or any entity. In an embodiment in which the intelligence is network based, memory 137 is used to store the rules, and microprocessor 136 is used to execute them.

In step 206, microprocessor 116 receives location information from one or more of location systems 114, 124, and 134. The location information, as described above, can represent the positions of wireless telephone 110 and vehicle 120 in a coordinate system. A change of position with respect to time can be calculated as speed. In some embodiments, speedometer 125 can be used in lieu of location system 124 to provide speed information of vehicle 120.

In step 208, microprocessor 116 monitors whether the location information received satisfies one or more of the conditions specified in the rules.

In step 210, as long as the information received by microprocessor 116 indicates that it is safe to operate wireless telephone 110, e.g., none of the conditions specified in step 202 has been satisfied, the process repeats the cycle of steps 212, 208, and 210, during which wireless telephone 110 can be used normally, i.e., without having to unit mating units 119 and 129.

If instead in step 210 it is determined that a potentially unsafe condition exists, e.g., wireless telephone 110 is located within ten feet of vehicle 120 (see Rule No. 1), the process goes to step 214. In step 214, the user is notified that mating units 119 and 129 must be united to enable proper functioning of wireless telephone 110 in a hands-free mode. The notification may be auditory or visual. For example, a prerecorded message may be output by speaker 112 to ask the user to unite mating units 119 and 129. The prerecorded messages can be stored in memory 127 or an auxiliary memory dedicated to message storage. Alternatively, a blinking light might call the user's attention for a textual or graphical warning shown on a display device of wireless telephone 110. If, however, it is determined that vehicle 120 is moving in step 210 (see Rule Nos. 2 and 3), then the process continues in step 222, in which a service feature of wireless telephone 110 is executed. For example, wireless telephone 110's wireless communication capabilities are disabled in step 222.

In step 216, microprocessor 116 determines whether the user follows the instructions provided in step 214. If so, the process goes to step 218, otherwise, the process go to steps 220 and 222.

In step 218, after the user followed the instruction in step 214, wireless telephone 110 operates in a hands-free mode. In other words, instead of using speaker 112 for output of sound, speaker 122 of vehicle 120 is used. In some embodiments, as suggested above, speaker 112 itself can be adapted to output sound at a higher decibel to enable the user of wireless telephone to hear during the hands-free mode.

If in step 216 the user ignores the notification, i.e., the user fails to unite mating units 119 and 129 as instructed in step 214, the process goes to step 222, in which the voice communication session is terminated by microprocessor 116. Preferably, an optional warning can be issued in step 220 to the user to unite mating units 119 and 129 before wireless telephone 110 is disabled in step 222.

Figure 3:
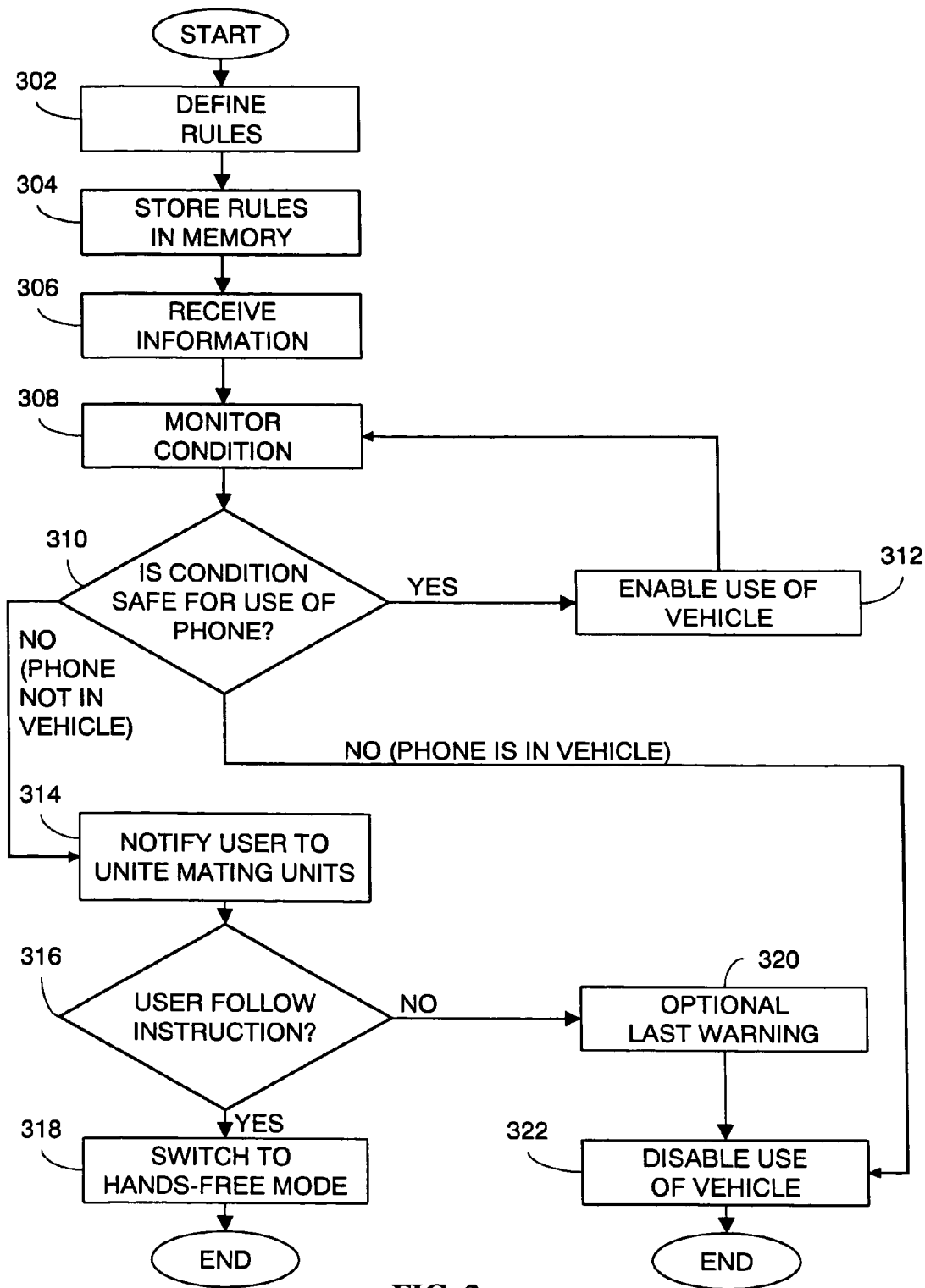
FIG. 3 is a flowchart illustrating exemplary steps involved in using another embodiment of the invention in which the vehicle is disabled unless the wireless telephone is in the hands-free mode.

FIG. 3 is a flowchart showing exemplary steps involved in using a different embodiment of the present invention. For convenience and illustration purposes, references are made to elements shown in FIG. 1. Steps 302 through 322 are generally similar to corresponding steps 202 through 222. The main difference is that the intelligence is in microprocessor 126 instead of microprocessor 116.

In step 302, the rules for this embodiment may include, for example:

Rule No. 4: When wireless telephone 110 is being used by a user who is approaching within ten feet of vehicle 120, notify the user that vehicle 120 should not be driven if the user plans to continue using wireless telephone 110.

Rule No. 5: When wireless telephone 110 is detected to be engaging in a wireless communication session within vehicle 120, suspend operation of vehicle 120, e.g., disable ignition system 121, until mating units 119 and 129 are united.

In step 304, the rules are stored in memory 127, which is accessible to microprocessor 126. Memory 127 may be an integrated component of microprocessor 126 or it may be a separate unit. The rules may be stored in memory 127 using any known format. For example, the rules can be input by the manufacturer of wireless telephone 110, representative of network 100, the user of wireless telephone 110, or another entity.

In step 306, microprocessor 126 receives location information from one or more of location systems 114, 124, and 134. The location information, as described above, represents the positions of wireless telephone 110 and vehicle 120. In addition, microprocessor 126 can receive speed information from speedometer 125.

In step 308, microprocessor 126 monitors whether the information received in step 306 satisfies one or more of the conditions specified in the rules.

In step 310, as long as it is determined that it is safe to operate vehicle 120, e.g., none of the conditions specified in step 302 has been satisfied, the process repeats the cycle of steps 312, 308, and 310, in which vehicle 120 can be used. Specifically, in step 312, microprocessor 126 does not interfere with normal operation of any component of vehicle 120.

However, if in step 310 it is determined that a potentially unsafe condition exists to operate vehicle 120, e.g., wireless telephone 110 is approaching within ten feet of vehicle 120 (see Rule No. 4), the process goes to step 314. If it is determined the wireless telephone 110 is within vehicle 120 (see Rule No. 5), the process goes directly to step 322.

In step 314, the user is notified that mating units 119 and 129 must be united to enable proper functioning of vehicle 120. The notification may be auditory or visual. For example, a prerecorded sound may be output by speaker 122 to inform the user to unite mating units 119 and 129. Alternatively, a blinking light on the dash board of vehicle 120 may be used to call the user's attention.

If the user follows the instructions in step 316, i.e., the user unites mating units 119 and 129, the process goes to step 318.

In step 318, wireless telephone 110 operates in a hands-free mode. In other words, speaker 122 of vehicle 120 is used to output sound signal received by wireless telephone 110. Alternatively, speaker 112 may be adapted to operate in the hands-free mode.

However, if in step 316 the user ignores the notification, i.e., the user fails to unite mating units 119 and 129 as instructed in step 314, the process goes to step 322, in which vehicle 120 is disabled by microprocessor 126. Disabling can be done, for example, by microprocessor 126 that suspends operation of ignition system 121 of vehicle 120. An optional warning may be issued in step 320 to the user to unite mating units 119 and 129.

Figure 4:
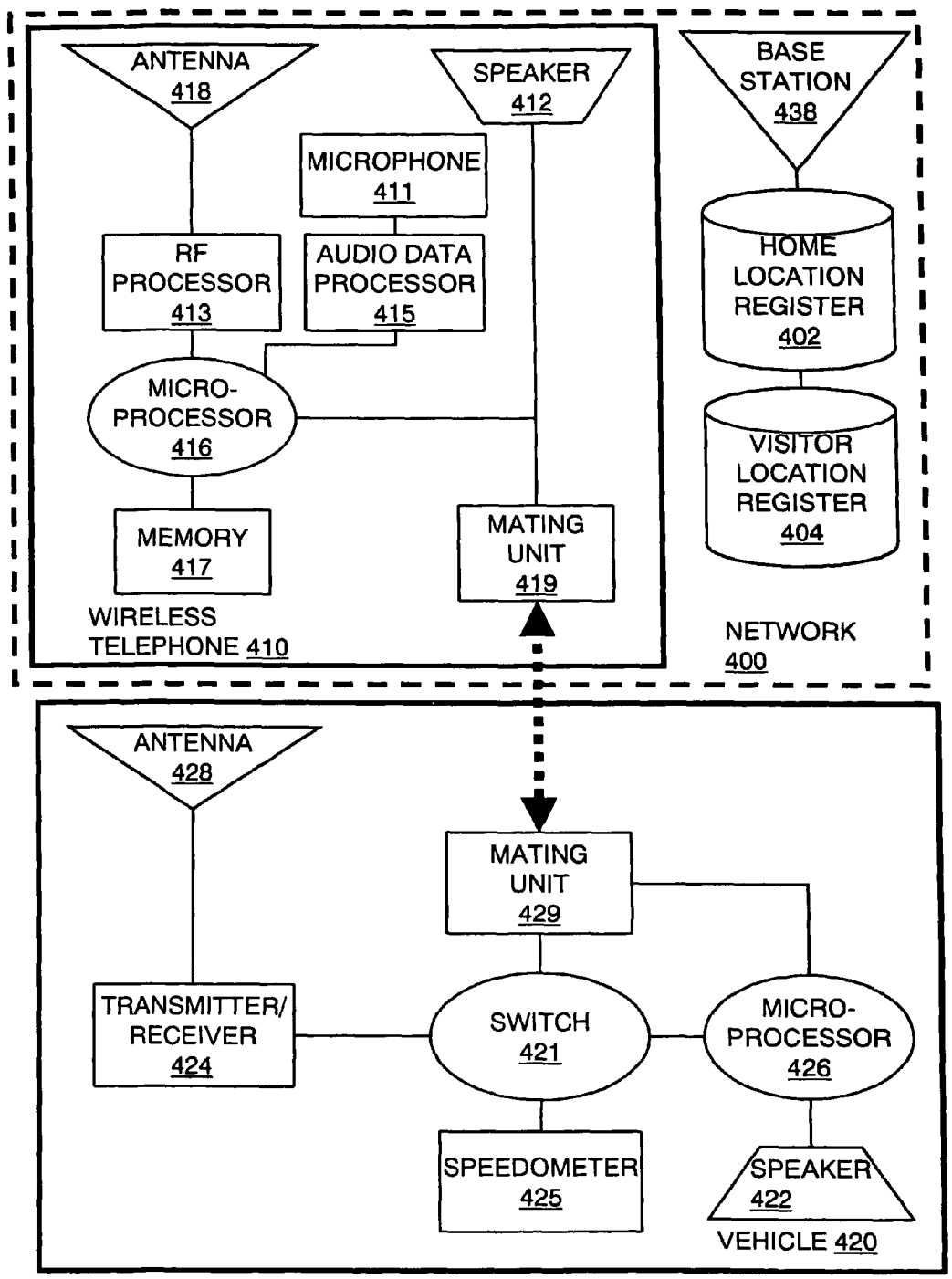
FIG. 4 is a schematic diagram showing a system architecture of another embodiment of the invention in which the vehicle generates an interference to prevent use of the wireless telephone unless the wireless telephone is in the hands-free mode.

FIG. 4 is a schematic diagram showing a system architecture of a different embodiment of the invention in which the vehicle generates interference to prevent use of the wireless telephone unless the wireless telephone is in the hands-free mode.

Wireless telephone comprises microphone 411, speaker 412, RF processor 413, audio data processor 415, microprocessor 416, memory 417, antenna 418, and mating unit 419. Wireless telephone 410 operates within wireless communication network 400, which includes home location register (HLR) 402, visitor location register (VLR) 404, and base station 438. Vehicle 420 may be an automobile, a bus, a truck, or other vehicle within which wireless telephone 410 may be adapted to operate in a hands-free mode.

Switch 421, speaker 422, transmitter/receiver (transceiver) 424, speedometer 425, microprocessor 426, antenna 428, and mating unit 429 are components of vehicle 420.

Mating unit 419 of wireless telephone 410 is adapted to mate with corresponding mating unit 429 of vehicle 420. Mating units 419 and 429 enable wireless telephone 410 to rest securely within vehicle 420. Preferably, mating units 419 and 429 have conductors that enable transmission of signals from wireless telephone 410 to vehicle 420. For example, audio signals received or generated by wireless telephone 410 can be channeled through mating units 419 and 429 for output by speaker 422. Like mating units 119 and 129 described above, mating units 419 and 429 can be adapted to transmit audio signals wirelessly using an FM channel using, for example, the technology disclosed in the '794 patent.

HLR 402, VLR 404, and base station 438 are components of network 400. When wireless telephone 410 is powered on, it "listens" on a control channel for a system identification code (SID) associated with network 400 during a communication session. Also during the communication session, one or more of wireless telephone 410's ESN and MIN are provided to wireless communication network 400. This allows network 400, through a mobile telephone switching office (MTSO) associated with base station 438, to assign a voice channel (a duplex channel with a frequency pair) for wireless telephone 410 to communicate with another telephone using antenna 418.

During a voice communication session between wireless telephone 410 and another telephone via network 400, wireless telephone 410 transmits a radio signal that is associated with a signal strength. The signal strength is at its peak level near wireless telephone 410. The signal strength is increasingly weaker away from wireless telephone 410. As it is well known to those skilled in the art, the signal strength varies inversely proportionately to the distance squared $1/r^2$. Transceiver 424 can be tuned to detect the signal transmitted by wireless telephone 410. Therefore, as it is known to those skilled in the art, as wireless telephone 410 approaches vehicle 420, the signal strength, as detected by transceiver 424, increases. When transceiver 424 detects a signal strength that exceeds a certain threshold, transceiver 424 creates an interference to jam the signal used by wireless telephone 410. Preferably, the interference is calibrated to affect only a small space surrounding transceiver 424. For example, the interference only has an effect within the driver seat area of vehicle 420 (e.g., within a predetermined distance, such as about two feet of the steering wheel of vehicle 420). This enables someone other than the driver to use wireless telephone 410. The interference can be created using any known methods. For example, a radio signal that is stronger than that of wireless telephone 410 can be used as the interference.

In one embodiment, transceiver 424 is preferably not activated until vehicle 420 is moving. In other words, transceiver 424 can be powered on or otherwise activated when vehicle 420 is in motion. For example, transceiver 424 is powered on when speedometer 425 registers a motion of vehicle 420. In another embodiment, transceiver 424 can be activated when the engine of vehicle 420 is running. Here, microprocessor 426 can be adapted to power on transceiver 424 when an ignition system of vehicle 420 is used to start the engine.

Mating unit 429 preferably has switch 421 incorporated within. Switch 421 controls transceiver 424. When mating units 419 and 429 are united, e.g., mating unit 419 is inserted into mating unit 429, switch 421 deactivates transceiver 424, resulting in termination of the interference and enablement of wireless telephone 410 to operate in the hands-free mode.

In lieu of switch 421, mating unit 429 may be equipped with a sensing device (not shown) that communicates with microprocessor 426. When the sensing device detects that mating units 419 and 429 have been united, microprocessor deactivates transceiver 424.

When mating units 419 and 429 are separated while vehicle 420 is in motion, transceiver 424 is re-activated, the interference is resumed, and wireless telephone 410 is once again incapable of establishing or maintaining a wireless communication session.

Figure 5:
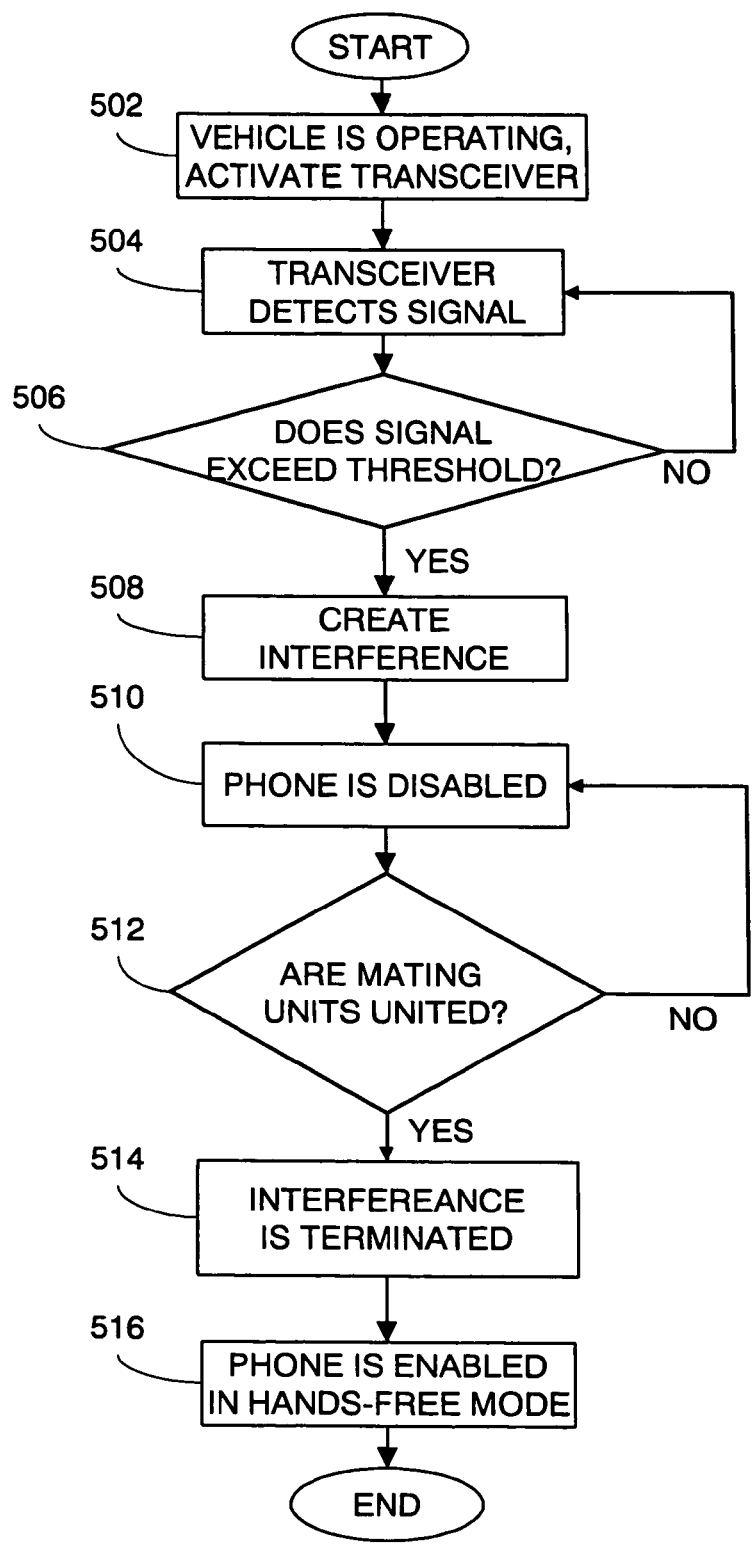
FIG. 5 is a flowchart illustrating exemplary steps involved in using an embodiment of the invention in which no wireless communication session may be established by any wireless telephone within the vehicle except during a hands-free mode.

FIG. 5 is a flowchart illustrating exemplary steps involved in using an embodiment of the invention in which no wireless communication session may be established by any wireless telephone within vehicle 420 when vehicle 420 is in motion, unless mating units 419 and 429 are united to enable a hands-free mode.

In step 502, when vehicle is operating, transceiver 424 is powered on or activated. In one embodiment of the present invention, transceiver 424 is powered on when the engine of vehicle 420 is running whether or not vehicle 420 is moving. In another embodiment of the present invention, transceiver 424 is activated only when vehicle 420 is in motion. Activation of transceiver 424 can be controlled through switch 421, which is in communication with one or both of speedometer 425 and microprocessor 426.

In step 504, transceiver 424 scans for signals transmitted by wireless telephone 420. As discussed above, the signal strength detected by transceiver 424 can be used to determined the proximity of wireless telephone 420 from transceiver 424.

In step 506, as long as the signal strength detected by transceiver 424 does not exceed a certain threshold, the process repeats steps 504 and 506. The threshold may be, for example, a signal strength that indicates that wireless telephone 410 is located within vehicle 420. For example, the threshold may correspond to a distance of two feet from transceiver 424. In this example, if wireless telephone 410 is more than two feet away from transceiver 424, wireless telephone 410 is not interfered with. Transceiver 424 is preferably installed within the steering wheel of vehicle 420.

If in step 506 the detected signal strength exceeds the threshold, then the process goes to step 508.

In step 508, transceiver 424 creates an interference to prevent communication using wireless telephone 410. The interference preferably corresponds with the frequency or frequencies used by wireless telephone 410. Preferably, the interference is calibrated so that it only affects use of wireless telephone 410 within a predetermined distance of transceiver 424. For example, the interference can be calibrated to only affect an area within two feet of transceiver 424. This calibration prevents only the driver of vehicle 424 from using wireless telephone 410. In other words, the calibration allows other passengers to use wireless telephone 410 while vehicle 420 is in motion. Moreover, calibration limiting the effective range of the interference may be required to comply with FCC regulations.

In step 510, wireless telephone 410 is disabled if it is located within the space affected by the interference that is created in step 508. Wireless telephone 410 remains disabled as long as mating units 419 and 429 are not united.

In step 512, if mating units 419 and 429 are united by, for example, inserting wireless telephone 410 into a cradle system within vehicle 420, i.e., mating units 419 and 429 are united, the interference is terminated in step 514. In one embodiment of the present invention, switch 421 interrupts power supplied to transceiver 424 when mating units 419 and 429 are united. Alternatively, microprocessor 426 may be adapted to deactivate transceiver 424 when mating units 419 and 429 are united.

In step 516, as a result of noninterference from transceiver 424, wireless telephone 410 is enabled to operate in a hands-free mode. The hands-free mode may involve, for example, outputting audio signals received by wireless telephone 410 using speaker 422.

Figure 6:
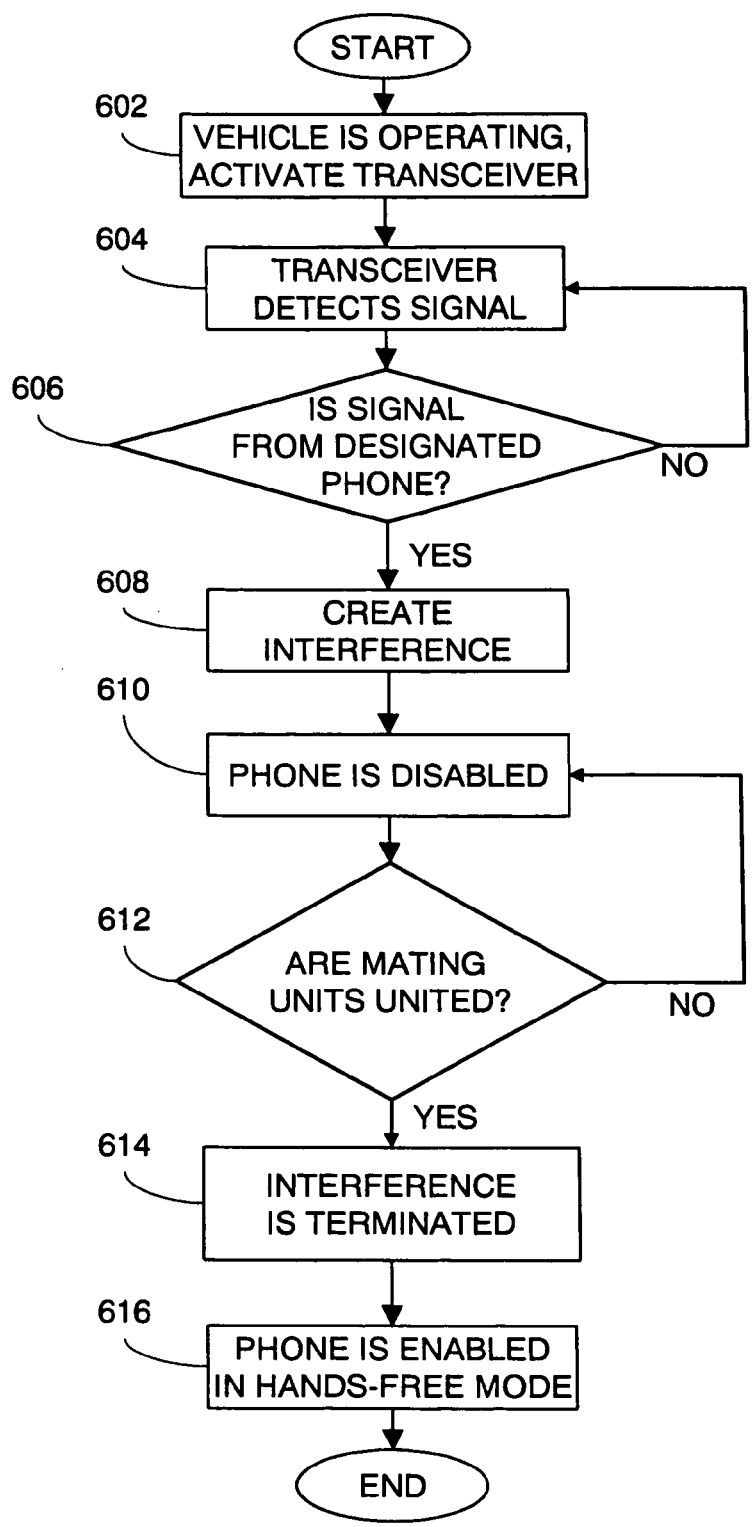
FIG. 6 is a flowchart illustrating exemplary steps involved in using an embodiment of the invention in which no wireless communication session may be established by a specific wireless telephone within the vehicle except during a hands-free mode.

FIG. 6 is a flowchart illustrating exemplary steps involved in using an embodiment of the invention in which no wireless communication session may be established by a specific wireless telephone within the vehicle except during a hands-free mode. In this embodiment, only wireless telephones whose identity information is recognized by microprocessor 426 will be interfered with.

Steps 602 through 616 are generally similar to corresponding steps 502 through 516. In this embodiment, identity information of wireless telephone 410 is preloaded in a memory accessible by microprocessor 426.

In steps 602 and 604, transceiver 424 detects signals transmitted by all wireless telephones in the vicinity of vehicle 420. In this embodiment, transceiver 424 is preferably adapted to tune in to the control channels used by wireless telephones that operate within network 400.

In step 606, transceiver 424, in cooperation with microprocessor 426, processes the signals received to determine whether the identity information incorporated within the signals is one that which has been preloaded in the memory. In other words, microprocessor 426 and transceiver 424 determine specifically whether wireless telephone 410 is operating with the vicinity of transceiver 424.

If wireless telephone 410 is in the vicinity, then the identity information received by microprocessor 426 would match that which is preloaded in the memory. As a result, an interference is created to disrupt communication of wireless telephone 410 in steps 608 and 610, unless mating units 419 and 429 are united in step 612.

Steps 608 through 616 are generally similar to corresponding steps 508 through 516. This embodiment allows wireless telephones not recognized by microprocessor 426 to operate freely within vehicle 420.

Figure 7:
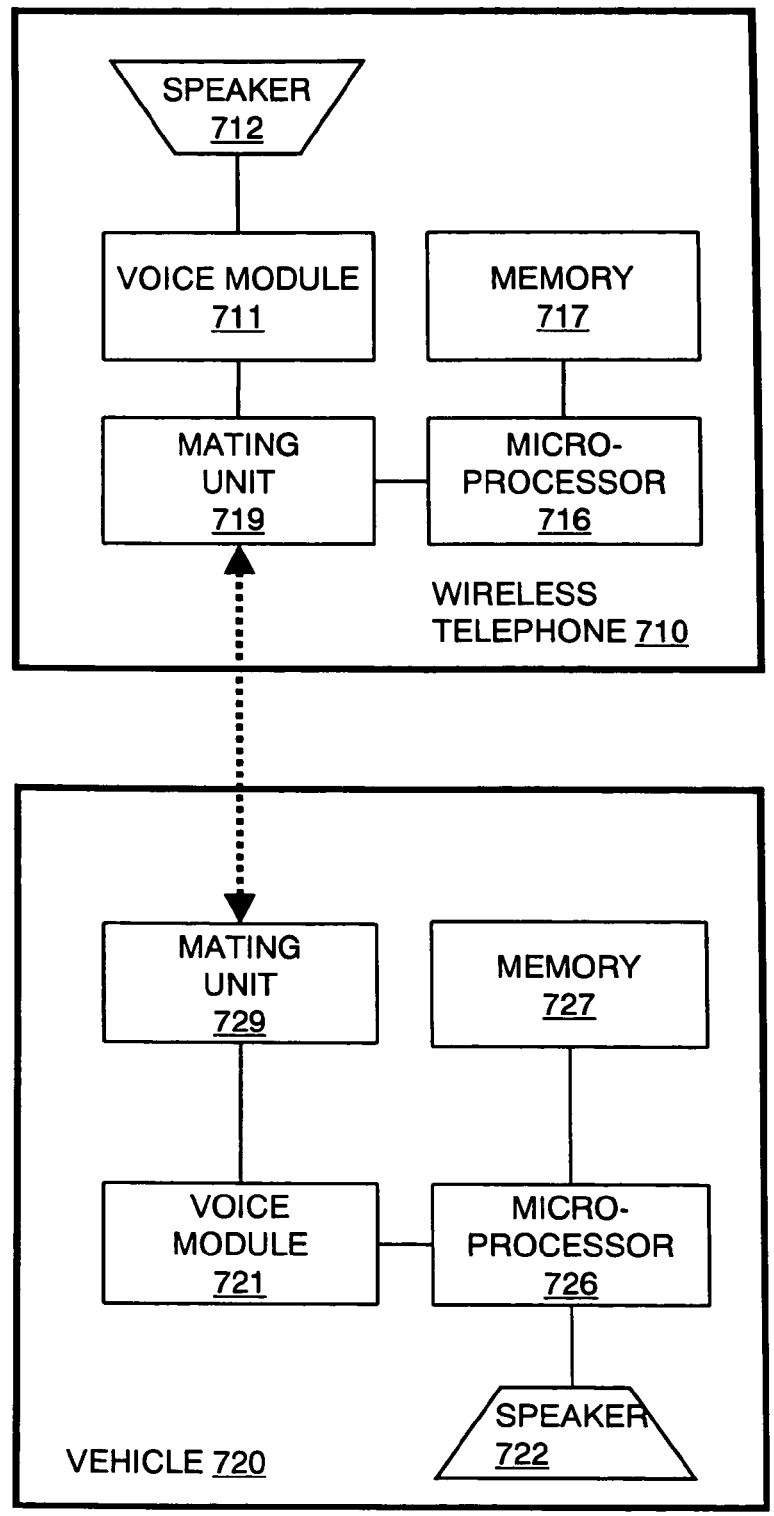
FIG. 7 is a schematic diagram showing a system architecture of an embodiment of the invention that incorporates a sound module.

FIG. 7 is a schematic diagram of a system architecture of another embodiment of the invention in which voice module 711 is a component of wireless telephone 710. It is understood that wireless telephone 710 can be one of wireless telephones 110 and 410, or a variation thereof. In other words, one of wireless telephone 110 and 410 described above can be adapted to include voice module 711 to implement this invention. As an alternative to voice module 711, voice module 721 associated with vehicle 720 may be used. One or both voice modules 711 and 721 are used to enable the user of wireless telephone 710 to dial telephone numbers or otherwise operate wireless telephone 710 using his or her voice during the hands-free mode.

Voice modules 711 and 721 can use one of several known voice recognition technologies. For example, the technologies disclosed in U.S. Pat. Nos. 5,042,063, 5,165,095, 5,452,340, 5,499,288, 5,826,199, 5,991,364, 6,009,383, and 6,018,568, each of which is herein incorporated by reference in its entirety, may be adapted to implement the present invention.

Figure 8:
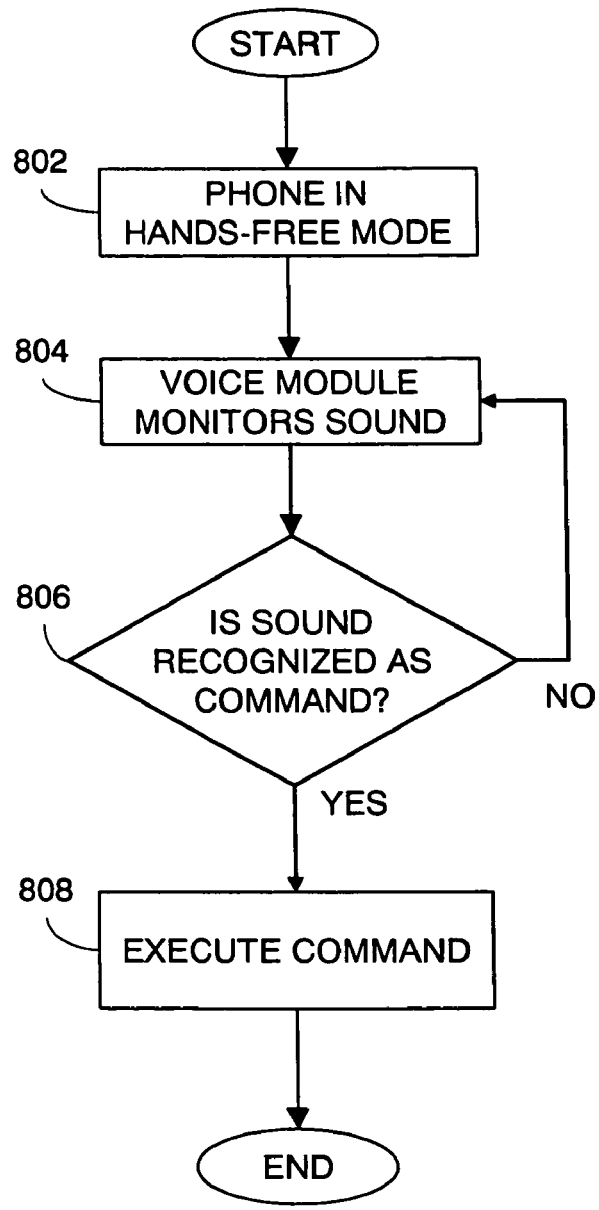
FIG. 8 is a flowchart illustrating exemplary steps involved in using an embodiment of the invention that incorporates a sound module.

FIG. 8 is a flowchart illustrating exemplary steps involving in using wireless telephone 710 in a hands-free mode using voice module 711. In step 802 (which may be an equivalent step to one of steps 218, 318, 516, and 616 described above), wireless telephone 710 is operating in the hands-free mode.

In step 804, voice module 711 monitors the sound received by a microphone (not shown) associated with wireless telephone 710.

In step 806, microprocessor 716 determines whether the sound received is a recognized command. If the sound is not a command, for example, a normal conversation is detected in step 804, the process repeats steps 804 and 806. If the sound received in step 804 is recognized as a command in step 806, however, the process continues in step 808. For example, the user may say "call home" in step 804 and the phrase "call home" is understood by microprocessor 716 to dial a specific number stored in memory 717, which is accessible to microprocessor 716.

In step 808, the command associated with the sound is executed. For example, the telephone number of the user's home is dialed.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for operating wireless devices in vehicles, the method comprising:
    monitoring a relationship between a wireless device and a vehicle by evaluating geographical location information that specifies a geographical location of the wireless device and that specifies a geographical location of the vehicle, wherein the geographical location information is generated for each of the wireless device and the vehicle by at least one location system, to determine the relationship by comparing the geographical location of the wireless device to the geographical location of the vehicle; and
    enabling operation of the wireless device in a hands-free mode if the relationship satisfies a condition.

2. The method of claim 1, wherein the relationship indicates that the wireless device is located within the vehicle.

3. The method of claim 1, further comprising measuring a signal strength transmitted by the wireless device by a transceiver associated with the vehicle in addition to evaluating the geographical location information.

4. The method of claim 1, wherein the wireless device is a wireless telephone.

5. The method of claim 1, wherein the enabling operation of the wireless device in a hands-free mode is performed by the wireless device.

6. The method according to claim 1, further comprising:
    disabling non-hands-free operation of the wireless device if the positional relationship indicates that the wireless device is located within the vehicle.

7. The method according to claim 6, wherein said disabling non-hands-free operation is limited to a particular region relative to the vehicle.

8. The method according to claim 6, wherein said disabling comprises:
    generating an interference signal to disrupt non-hands-free operation of the wireless device.

9. A method for using a wireless telephone in a vehicle, the method comprising:
    determining presence of the wireless telephone within the vehicle by finding a geographic location of the wireless telephone, finding a geographic location of the vehicle, and comparing the geographic location of the wireless telephone to the geographic location of the vehicle; and
    enabling a hands-free mode of the wireless telephone if the wireless telephone is present within the vehicle.

10. The method of claim 9, wherein the determining is performed by a geonavigational positioning system.

11. The method of claim 9, wherein the enabling is performed by a microprocessor that controls the wireless telephone.

12. The method according to claim 9, further comprising:
disabling non-hands-free operation of the mobile device if the positional relationship indicates that the wireless device is located within the vehicle.

13. The method according to claim 12, wherein said disabling non-hands-free operation is limited to a particular region relative to the vehicle.

14. The method according to claim 12, wherein said disabling comprises:
generating an interference signal to disrupt non-hands-free operation of the wireless device.

15. A system for operating wireless devices in vehicles, the system comprising:
means for determining a positional relationship between a wireless device and a vehicle by generating position data for the wireless device and generating position data for the vehicle and by comparing the position data for the wireless device to the position data of the vehicle;
means for defining a condition based on the positional relationship for enabling a hands-free mode; and
means for enabling the wireless device to operate in the hands-free mode where the positional relationship of the wireless device being in the vehicle is satisfied.

16. The system of claim 15, wherein the determining means comprises a wireless communication network location system.

17. The system of claim 15, wherein the determining means comprises a GPS receiver in the wireless device and a GPS receiver in the vehicle.

18. The system of claim 15, wherein the wireless device is a wireless telephone.

19. The system according to claim 15, further comprising:
means for disabling non-hands-free operation of the mobile device if the positional relationship indicates that the wireless device is located within the vehicle.

20. The system according to claim 19, wherein said means for disabling comprises:
means for generating an interference signal to disrupt non-hands-free operation of the wireless device.

21. A storage medium containing processor-executable instructions that, when executed by a processor, cause the processor to perform a method comprising:
comparing geographical location information obtained for a mobile device and geographical location information obtained for a vehicle to determine a positional relationship between the mobile device and the vehicle; and
enabling a hands-free mode of operation of the mobile device if the positional relationship indicates that the mobile device is located within the vehicle.

22. The medium according to claim 21, wherein the method further comprises:
disabling non-hands-free operation of the mobile device if the positional relationship indicates that the mobile device is located within the vehicle.

23. The medium according to claim 22, wherein said disabling non-hands-free operation is limited to a particular region relative to the vehicle.

24. The medium according to claim 22, wherein said disabling comprises:
generating an interference signal to disrupt non-hands-free operation of the mobile device.

* * * * *

UNITED STATES PATENT AND TRADEMARK OFFICE
CERTIFICATE OF CORRECTION

| | | |
|---|---|---|
| PATENT NO. | : 7,957,773 B2 | Page 1 of 1 |
| APPLICATION NO. | : 10/725579 | |
| DATED | : June 7, 2011 | |
| INVENTOR(S) | : Chua et al. | |

It is certified that error appears in the above-identified patent and that said Letters Patent is hereby corrected as shown below:

Title page, item (56), under "Other Publications", in Column 2, Line 3, delete "Prelimary" and insert -- Preliminary --.

Column 1, line 4, below "Title" insert -- CROSS-REFERENCE TO RELATED APPLICATION --.

Signed and Sealed this
Eighteenth Day of October, 2011

David J. Kappos
*Director of the United States Patent and Trademark Office*